(12) United States Patent
Härkönen

(10) Patent No.: US 9,226,362 B2
(45) Date of Patent: Dec. 29, 2015

(54) TRANSPARENT INORGANIC THIN-FILM ELECTROLUMINESCENT DISPLAY ELEMENT AND METHOD FOR MANUFACTURING IT

(71) Applicant: Beneq Oy, Vantaa (FI)

(72) Inventor: Kari Härkönen, Vantaa (FI)

(73) Assignee: Beneq Oy, Espoo (FI)

( * ) Notice: Subject to any disclaimer, the term of this patent is extended or adjusted under 35 U.S.C. 154(b) by 0 days.

(21) Appl. No.: 14/409,910

(22) PCT Filed: Jun. 20, 2013

(86) PCT No.: PCT/FI2013/050681
§ 371 (c)(1),
(2) Date: Dec. 19, 2014

(87) PCT Pub. No.: WO2014/009601
PCT Pub. Date: Jan. 16, 2014

(65) Prior Publication Data
US 2015/0189718 A1    Jul. 2, 2015

(30) Foreign Application Priority Data
Jun. 21, 2012    (FI) ..................................... 20125695

(51) Int. Cl.
H05B 33/14    (2006.01)
H05B 33/28    (2006.01)
H05B 33/12    (2006.01)
H01J 9/00    (2006.01)
H05B 33/10    (2006.01)
H05B 33/08    (2006.01)

(52) U.S. Cl.
CPC ............ *H05B 33/14* (2013.01); *H05B 33/0896* (2013.01); *H05B 33/10* (2013.01); *H05B 33/12* (2013.01); *H05B 33/145* (2013.01); *H05B 33/28* (2013.01)

(58) Field of Classification Search
None
See application file for complete search history.

(56) References Cited

U.S. PATENT DOCUMENTS 5,314,759 A * 5/1994 Harkonen et al. ............ 428/690
5,539,424 A    7/1996 Hattori et al.
(Continued)

OTHER PUBLICATIONS

International Search Report for International Application No. PCT/FI2013/050681 dated Oct. 28, 2013.
(Continued)

*Primary Examiner* — Ashok Patel
(74) *Attorney, Agent, or Firm* — Alston & Bird LLP

(57) ABSTRACT

An inorganic, transparent thin film electroluminescent display element with a display area having at least one emissive area and at least one non-emissive area, improved in terms of transparency and inconspicuousness is provided, as well as a method for its preparation. The structure according to the invention comprises a substrate (40), a first conducting layer (42), a first insulating layer (45), a luminescent layer (46), a second insulating layer (47), a second conductive layer (43) and a third insulating layer (44) comprising insulating, inorganic material. Emissive and non-emissive areas of the display are rendered optically similar by providing passive film elements (50) at the non-emissive areas, namely by providing conductor material also at these areas when the conductive electrodes connected to a power source for generating the required voltage are deposited at the emissive areas.

13 Claims, 14 Drawing Sheets

(56) References Cited

U.S. PATENT DOCUMENTS

| | | |
|---|---|---|
| 5,804,918 A | 9/1998 | Yazawa et al. |
| 6,414,439 B1 | 7/2002 | Tuenge et al. |
| 2005/0012455 A1 | 1/2005 | Lee et al. |
| 2008/0180020 A1 | 7/2008 | Cok |
| 2009/0167172 A1* | 7/2009 | Yamashita et al. ............ 313/506 |
| 2009/0236971 A1 | 9/2009 | Kuo et al. |
| 2010/0090597 A1 | 4/2010 | Werners et al. |
| 2010/0295446 A1* | 11/2010 | Yamamoto ................... 313/504 |
| 2011/0001146 A1* | 1/2011 | Yamazaki et al. .............. 257/79 |
| 2011/0298361 A1* | 12/2011 | Matsunaga et al. ........... 313/504 |
| 2012/0206675 A1* | 8/2012 | Seo et al. ........................ 349/96 |
| 2014/0097427 A1* | 4/2014 | Nakamura et al. .............. 257/40 |

OTHER PUBLICATIONS

International Preliminary Report on Patentability for International Application No. PCT/FI2013/050681 dated Dec. 23, 2014.

* cited by examiner (PRIOR ART)

(PRIOR ART)

(PRIOR ART)

C-C

D-D

TRANSPARENT INORGANIC THIN-FILM ELECTROLUMINESCENT DISPLAY ELEMENT AND METHOD FOR MANUFACTURING IT

TECHNICAL FIELD

This disclosure relates to the field of transparent displays and, more particularly, to the field of emissive transparent displays. Especially this disclosure relates to the field of AC-driven transparent inorganic thin film electroluminescent (TFEL) displays which are emissive transparent displays. More specifically this disclosure relates to improvement of the transparency and inconspicuousness of transparent inorganic thin film electroluminescent (TFEL) displays.

BACKGROUND

Transparent displays find use in applications where space is constrained and there is a need to provide the users with a dual set of information. For example, a first item of information may be provided by the display and a second item of information may be viewable through the display. In addition, transparent displays enable exciting designs for both professional and consumer use e.g. in applications where the product needs to be differentiated from conventional ones. Transparent displays may offer unique benefits enabling the viewer to localize objects behind the screen, or add superimposed warnings or messages on top of other information displays. Some future applications may use transparent head mounted displays (HMD's) in front of a user's eye, allowing addition of superimposed digital information on the normal field of vision.

In this context, a TFEL display element is a layered structure including the necessary components for light emission when connected to proper electronics. In this context, the display area is considered the transparent area of a TFEL display element which is visible to the observer of the display, and through which he/she can observe objects behind the display. In this context, the emissive area is considered the area which by design is capable to generate and emit light. In this context, the non-emissive area is considered the display area which is not part of the emissive area. Thus the display area comprises both emissive and non-emissive areas; this highlights the significance of optical properties over the whole display area and their impact on how an observer experiences the display.

In the operation of an emissive, transparent display, the ON and OFF states can be discerned. In the ON state, light is generated and emitted in the display element. In the OFF state, no light emission occurs in the display element, or it is insignificant. In general, a basic requirement for displaying the required information is to bring along sufficient contrast in brightness between adjacent ON and OFF elements. In transparent displays, a further requirement is that the observer gets a sufficiently clear and unobstructed view of the objects behind the display.

At its best, a transparent display is almost imperceptible by being first of all as transparent as possible. At the same time it is well known that the human eye is very sensible to differences in light intensity and color when adjacent areas of a display surface can be compared. From an imperceptibility point of view, it is particularly critical how consistently ambient light penetrates the various areas of the display visible to the observer and how it is reflected from these areas. Deviations in consistency can be observed as transmission differences (intensity or color of transmitted light) or reflection differences (intensity or color of reflected light). If there are differences in reflective and transmissive properties between different parts of the display structure, the viewer may observe e.g. conductor structures or shapes, which is not acceptable.

The transparency of a display can be defined by means of the concept photopic transmission in the visible light range. This can be measured using a double beam spectrometer, which produces a transmission spectrum with the transmission percentage as a function of the light wavelength. To provide a realistic view of transmission, this data can be scaled with the spectrum of a standard D65 light source. The light output over the wavelength range 420 nm-650 nm of the resulting spectra is divided by the corresponding light from the D65 source. Photopic transmission values and reflectivity values presented here or in attached figures and examples are defined to be perpendicular to the display surface plane. Other values may be preferred if an angle of incidence other than a perpendicular angle of incidence is used.

The photopic transmission of a single uncoated soda lime glass sheet is in the order of 85-92% due to the two glass-air interfaces and the reflections occurring there. The exact value is dependent on the glass material used, on nominal thickness of glass sheet and on its refractive index and optical absorption. Correspondingly, the transmission of two consecutive soda lime glass sheets is in the order of 78-84%. Materials having such photopic transmission values >78% are perceived as transparent, in particular when the transmission is sufficiently neutral with respect to the wavelength. In practice such designs are successfully used in protective structures for sensible instruments as well as in shop windows and dwellings.

AC-driven inorganic thin film electroluminescent (TFEL) technology is well known, and many important aspects of inorganic TFEL technology like basic physics, typical materials and properties of displays, driving methods and manufacturing technology are common and general knowledge. TFEL technology is especially well suitable for transparent display applications as it provides a light emitting display with potentially high transparency with photopic transmission values >50%. The main difference between transparent and conventional inorganic TFEL displays is that opaque metal electrode material (typically aluminum) is replaced by transparent electrode material, generally denoted transparent conductive oxide or TCO (typically indium tin oxide, ITO). Inorganic TFEL displays are known for excellent picture quality, rugged design and long-term reliability.

The thin film structure of a TFEL display includes a luminescent material layer (=phosphor) between two insulator layers. In a transparent TFEL display, transparent electrodes are provided on both sides of insulators. The two electrodes may be patterned to form rows and columns, respectively, whereby pixels are formed at the sites where a row and a column intersect. As a voltage is applied across an intersecting row and column, electroluminescence appears in the phosphor layer.

Apart from the matrix type display described above, other display types can be designed using TFEL technology, e.g. 7-segment number displays or designs displaying discrete icons or symbols at defined locations. In such displays, there are typically significant areas which are non-emissive, i.e. one or more of the layers necessary for generating light emission are not present in such areas.

Desirable properties of a transparent display are transparency and inconspicuousness or imperceptibility. The transmission of many present, emissive display designs is unsatisfactory. In designs based on OLED, LCD or powder EL, it is challenging to obtain a photopic transmission of even 60%. In state-of-the art transparent TFEL displays, transmission values above 60% can be achieved, but due to variation in the thin film structure the appearance of such displays has not been satisfactory.

It would be desirable to obtain a transmission level above 78%. No satisfactory designs for emissive displays have been suggested to achieve such properties, also not for transparent TFEL displays. To express transmission consistency over an area as a number value is not straightforward, but it should be as consistent as possible to maintain a neutral color impression.

From an imperceptibility point of view, it is particularly critical how consistently ambient light penetrates the various areas of the display visible to the observer and how it is reflected from these areas. Deviations in consistency can be observed as transmission differences (intensity or color of transmitted light) or reflection differences (intensity or color of reflected light). No workable solutions to this problem have been suggested for emissive, transparent displays, including transparent TFEL displays.

SUMMARY OF THE INVENTION

An inorganic, transparent thin film electroluminescent display element with a display area having at least one emissive area and at least one non-emissive area has now been invented, which offers several advantages over prior art structures.

In accordance with the present invention, a display element improved in terms of transparency and inconspicuousness is provided. The relevant properties are improved as follows: Emissive and non-emissive areas of the display are rendered optically similar by providing passive film elements, hereinafter abbreviated PFE, at the non-emissive areas. This is achieved by providing conductor material also at the non-emissive areas when the conductive electrodes connected to a power source for generating the required voltage, hereinafter conductor elements, are deposited at the emissive areas.

The structure according to the invention comprises a substrate, a first conducting layer comprising TCO material having a thickness in the range 30-250 nm; a first insulating layer; a luminescent layer comprising zinc sulfide, having a thickness in the range 30-250 nm; a second insulating layer; a second conductive layer comprising TCO material having a thickness in the range 30-250 nm; and a third insulating layer comprising insulating, inorganic material having a lower refractive index than that of the second conductive layer. According to the invention, each of said first and second conducting layers comprises at least one conductor element at the at least one emissive area and at least one passive film element at the at least one non-emissive area.

Thus, according to the present invention, there is conductor material present in the conductive layers both in the emissive areas and in the non-emissive areas, the conductor material in the latter areas being the passive film elements.

Preferably, the first conducting layer is optically matched to the substrate to reduce reflection by coating the substrate with at least one layer of isolating, inorganic material, the refractive index of which is lower than that of the conductive material.

Preferably, the second conducting layer is optically matched to the environment to reduce reflection by coating it with at least one layer of isolating, inorganic material, the refractive index of which is lower than that of the conductive material.

The passive film elements are formed at the same time as the first and second layers of conductive material are patterned, respectively. Consequently, both layers of conductive material comprise at least one area which is not electrically connected to a source providing the required voltage to the electrodes in the emissive areas. Preferably, at least at one location within the patterned layer of conductive material, the distance between the PFE and the electrode in the plane of the layer is 1-30 µm. Preferably, the total area of the emissive areas covered by electrodes and the PFE:s is >80% of the display area as defined above; preferably it is >90% and most preferably >95%.

To minimize losses, the material layers in which optical losses (scattering or absorption) occur are made thinner than conventionally in the prior art. The thickness of the luminescent layer is in the range 30 to 250 nm, preferably in the range 50 to 200 nm and most preferably in the range 100 to 180 nm. The thickness of the conducting layers is in the range 30 to 250 nm, preferably in the range 50 to 200 nm and most preferably in the range 100 to 200 nm. Preferably, the thicknesses of the insulating layers are in the range 30 to 500 nm, more preferably in the range 50 to 200 nm.

A display element according to the invention can be joined by adhesive to a transparent protective panel, like glass. On both sides of a thus protected display element, a transparent panel can be added for additional protection, like a shock-proof protective glass or a scratch-resistant protective panel.

Such a glass-protected display element can be joined in either position to an object which is to be observed through the display. To render the total structure thinner, it is sometimes advantageous to join a display element according to the invention directly to the object to be observed through the display. The relevant object need not be transparent.

According to a further aspect of the present invention, a method is provided for manufacturing a transparent thin film electroluminescent display element with a display area having at least one emissive area and at least one non-emissive area.

DETAILED DESCRIPTION

Figure 1:
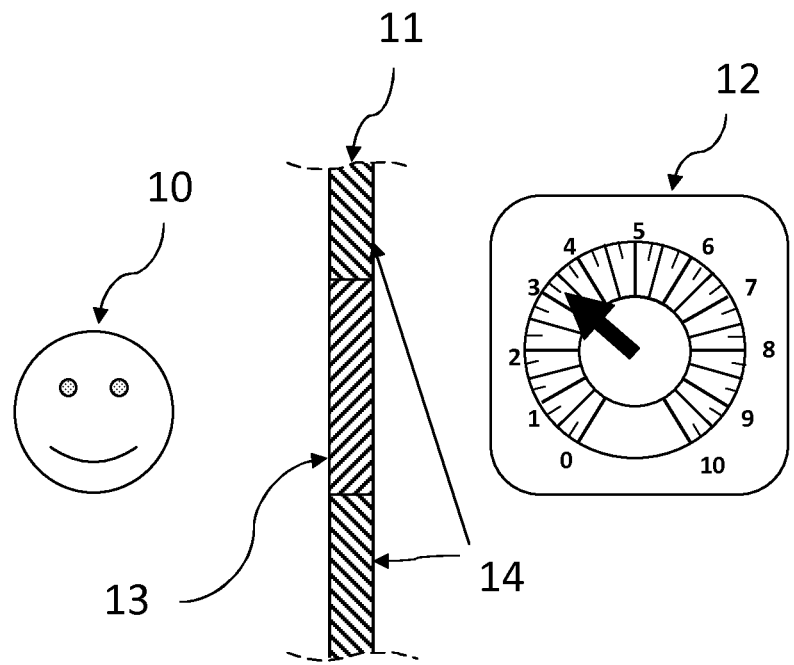
FIGS. 1A-1C illustrate various aspects of the use of a transparent display.
Figure 1:
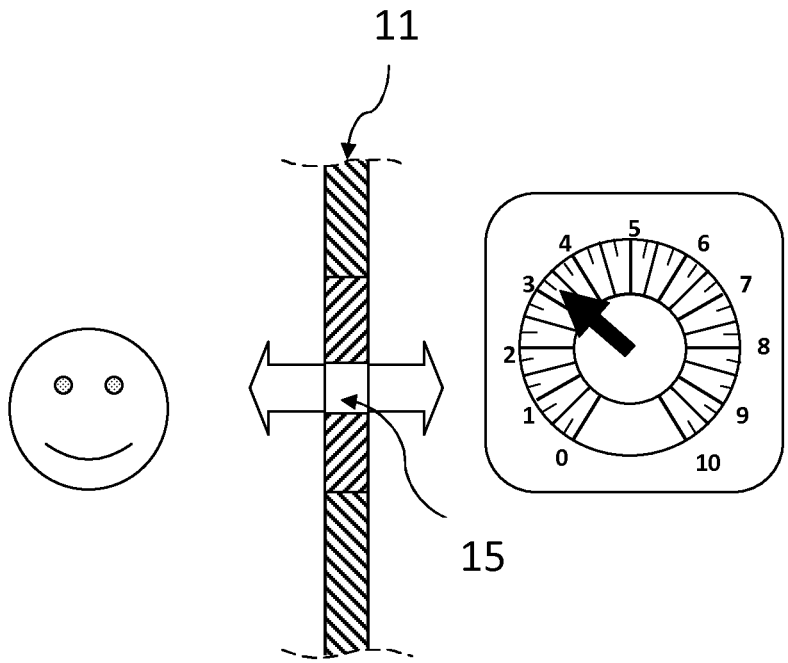
Figure 1:
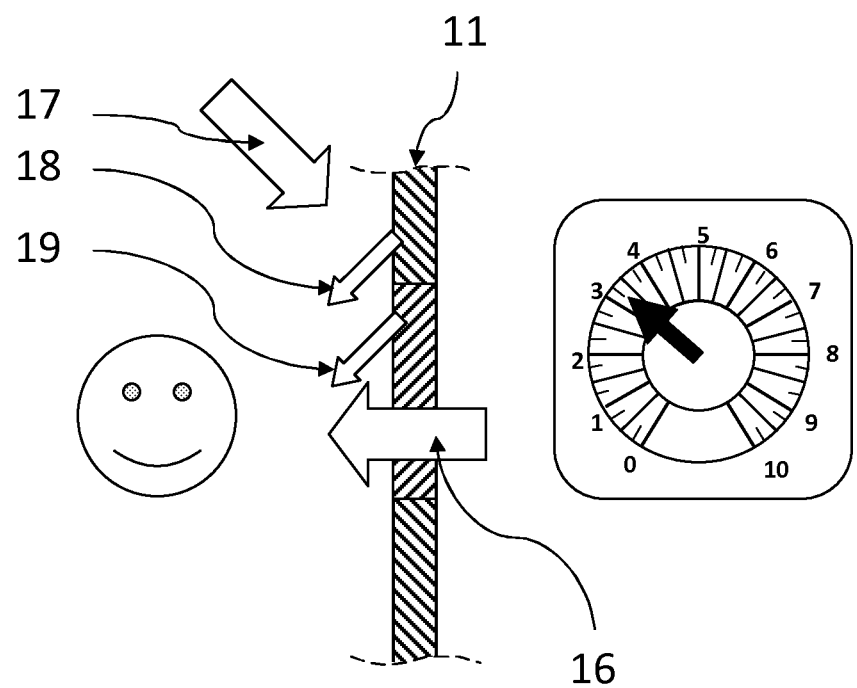

The present invention relates in particular to the AC-driven thin film structure of a transparent TFEL display, deposited on a substrate. A TFEL element according to the invention is connected via transparent leads to electronic components for supplying the required voltages and current to the TFEL element for generating light emission and thus information. The voltage difference in the conductors surrounding the luminescent layer generates an electrical field, causing light emission in the luminescent layer. The number and shape of the conductors are determined by the information and symbols to be displayed. The electronics and drive routines controlling the operation of the display element are part of the prior art. Drive routines known to the skilled person are e.g. segmented drive routines and multiplexed routines used in matrix structures.

In the operation of an emissive, transparent TFEL display, the ON and OFF states can be discerned. In the ON state, the display element emits light generated in the electroluminescent layer. The intensity of the light emission is sufficient to become visible in the light conditions of the relevant surroundings, being of sufficient contrast and enabling a viewer to observe the displayed information. In the OFF state, no light emission occurs in the TFEL element, or it is insignificant so the viewer does not observe it in the relevant lighting conditions.

In general, a sufficient requirement for the difference between ON and OFF states in emissive displays is the difference in brightness between adjacent ON and OFF elements to bring along sufficient contrast for displaying the required information. In transparent displays, a further requirement for the OFF state is that the observer gets a sufficiently clear and unobstructed view of the objects behind the display. At its best, a transparent display is almost imperceptible in its OFF state and has no impact on the observation of objects behind it. Although the display does not emit light in its OFF state, light is reflected from its surface and light passes through it towards the observer. If there are differences in reflective and transmissive properties between different parts of the display structure, the viewer may observe e.g. conductor structures or shapes, which is not acceptable.

A substrate in the context of this disclosure is the material providing the main, rigid structure of the display. Substrate materials may include soda lime, borosilicate, or any other glass material with sufficient transparency. In some embodiments, substrates other than glass materials may be suitable, such as polymer substrates which may provide greater mechanical durability or flexibility than glass. The photopic transmission of suitable substrates is preferably greater than 80%. In some embodiments, the transmission may be greater than 90% or even greater than 95% if one side of substrate includes anti-reflection coatings. Substrate thickness may be in the range of 0.05 mm-5 mm or more. In some embodiments, the thickness of the substrate may be in the range of 0.3 mm-3 mm or 0.5 mm-1.1 mm, and a suitable thickness is about 1.1 mm. In some embodiments, either or both sides of the substrate may be coated with a film in order to improve its suitability for transparent TFEL displays.

A variety of many different thin film materials may be used for TFEL display structures. In the present invention materials that are generally suitable for transparent TFEL display manufacturing are preferred.

Transparent electrode materials for the TFEL display may include indium tin oxide (ITO), ZnO:Al, $SnO_2$ or any other conductive material with sufficient transparency. The sheet resistance (Rs) of a suitable transparent electrode is preferably less than 500 Ohm/sq. In some embodiments, the Rs may be less than 100 Ohm/sq. In other embodiments, the Rs may be less than 20 Ohm/sq.

Manganese-doped zinc sulfide ZnS:Mn as the luminescent material is preferred for yellow emitting TFEL displays, and terbium-doped zinc sulfide ZnS:Tb as the luminescent material is preferred for green emitting TFEL displays. However, the selection of materials is not limited to these luminescent materials. Other luminescent material can be used and are preferred especially if other emission colors are needed.

At least part of the conducting layers may form a matrix of intersecting electrodes, whereby emissive pixels are formed at the sites of the intersections of the electrodes. At least part of the conducting layers may also be formed so as to provide emissive segments, icons, or symbols at predetermined locations of the display area. Such emissive areas can be used to provide, for example, 7-segment number displays or designs displaying discrete icons or symbols at desired locations.

Insulator, barrier, passivation and index matching materials for the TFEL display are preferably dielectric and may include aluminium oxide, titanium oxide, $SiO_2$, $HfO_2$, $ZrO_2$, and combinations and mixtures of these materials, or other suitable materials.

Many different manufacturing methods may be used for the TFEL display structure and for integrating or combining the TFEL display structure to other surfaces or components. Methods that are generally accepted as suitable for transparent TFEL display manufacturing are preferred and suitable also for the present invention.

A preferred manufacturing method for the TCO layers in a display element according to the invention is sputtering.

A preferred manufacturing method for luminescent and insulator layers of TFEL display, and for thin films of barrier and passivation layers is Atomic Layer Deposition (ALD). Other methods may be used to manufacture one or more of thin films layers, such as evaporation or various sputtering techniques. Preferred manufacturing method for patterning of thin films and particularly for patterning transparent electrode layers are commonly known, including lithography and printing methods.

According to an embodiment of the present invention, a preferred method of integrating or combining the thin film structure of the TFEL and a safety glass is optical bonding using a suitable adhesive, such as heat curable epoxy or light curable acrylic adhesive. In embodiments within the scope of the present invention, the adhesive used has a refractive index value in the range 1.35-1.70. Preferably, the refractive index may be in a range of about 1.40 to 1.60 or more preferably in a range of about 1.46 to 1.53. The thickness of the adhesive layer may be in the range 5-100 μm, preferably 10-50 μm. Preferably, no air gap exists between the thin film structure of the TFEL and the safety glass. An air gap could decrease the picture quality or the transmission of the display.

According to an embodiment of the present invention, at least one light emitting zone is provided in the display area for illuminating the area behind the display. Such a zone does not necessarily provide any information, but may be adapted for illumination purposes only.

The invention is discussed in further detail in the following with reference to the attached drawings.

FIG. 1 is a symbolic representation of a viewer 10 observing an object 12 through a transparent display 11. In FIG. 1A, the transparent TFEL display is in the OFF state and no light emission takes place. The display area of transparent TFEL display 11 comprises emissive area 13 and non-emissive area 14. In FIG. 1B, information is shown on the display 11 which thus is at least partially in an ON state, emitting light. It should be observed that light is emitted in both directions, both towards the observer and away from him/her. The emitted light forms the desired information 15 on the display, e.g. text or a graphic symbol.

In FIG. 1C, the viewer is at the left, observing an object at the right through a transparent display. Part of the ambient light 17 is reflected from the display. Part 18 of the ambient light is reflected at a non-emissive area and part 19 of the ambient light at an emissive area. Transmitted ambient light 16 provides an image of what is behind the display relative to the observer. For the display to be as inconspicuous as possible in the OFF state, it is crucial that reflection and transmission properties are consistent over the display area.

Figure 2:
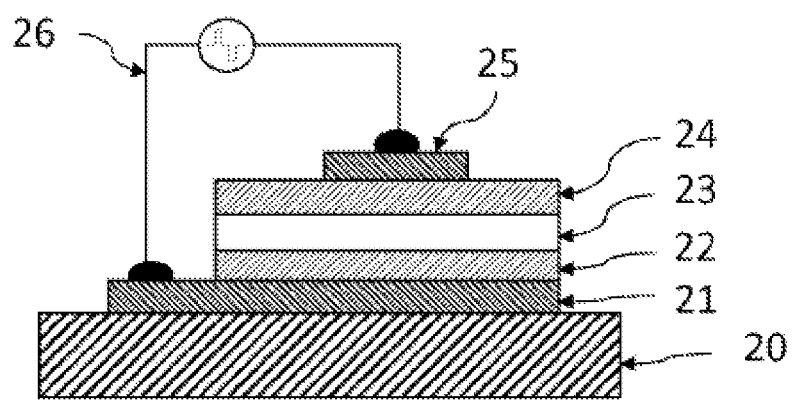
FIG. 2 shows the schematic thin film structure of a TFEL display.

In FIG. 2, the components of a transparent TFEL structure are schematically represented as follows: 20 is a transparent substrate; 21 is a first conductor layer made of TCO material; 22 is a first insulator layer; 23 is the luminescent (=phosphor) layer; 24 is a second insulator layer; 25 is a second conductor layer made of TCO material, and 26 represents an electrical arrangement for supplying a voltage difference between conductor layers 21 and 25.

FIG. 3A shows a side view of an optically improved transparent TFEL structure according to the prior art, on the transparent substrate 20. In addition to thin films shown in FIG. 2 there are index matching layers 30 and 31 next to conductor layers 21 and 25 made of TCO material, in order to decrease reflections. Refractive index of index matching layers 30 and 31 is lower than refractive index of conductor layers 21 and 25.

In FIG. 3B, the improved prior art arrangement of transparent TFEL structure in FIG. 3A is shown from above. Four areas having a different stack of thin films are identified as T21, T22, T23 and T24. Using optical film design software (Film Wizard) and a set of optical parameters for relevant examples of materials (listed in Tables 1, 2, 3, 4 and 5) in each layer, transmission and reflection properties were calculated. The results are presented in Table 6.

From the calculated values we notice that there are differences in photopic transmission values starting from 66.8% up to 77.0% for different display areas. These transmission variations are visible to the viewer. On the other hand, the results do indicate differences in reflectivity starting from 7.2% up to 11.7% for the different display areas. In addition to the average reflection variation there are differences relative to the light wavelength, showing a strong greenish reflection peak for areas T22 and T23 in which a second conductor layer made of TCO material 25 is present. These reflection variations become visible in ambient light and are visible to the viewer. It is clear that further improvement is needed but the prior art does not provide any suggestions on how to make different areas of a display more consistent. It is the purpose of the present invention to provide a technically feasible solution to this problem.

TABLE 1

Glass substrate 20

| Wavelength (nm) | n | k |
|---|---|---|
| 400 | 1.512 | 6.872E−07 |
| 450 | 1.493 | 6.402E−07 |
| 500 | 1.485 | 5.685E−07 |
| 550 | 1.485 | 5.820E−07 |
| 600 | 1.490 | 6.471E−07 |
| 650 | 1.499 | 7.471E−07 |
| 700 | 1.511 | 7.107E−07 |

TABLE 2

TCO layers 21 and 25

| Wavelength (nm) | n | k |
|---|---|---|
| 400 | 1.960 | 5.000E−03 |
| 450 | 1.905 | 4.000E−03 |
| 500 | 1.855 | 4.400E−03 |
| 550 | 1.810 | 5.000E−03 |
| 600 | 1.775 | 7.000E−03 |
| 650 | 1.745 | 1.000E−02 |
| 700 | 1.715 | 1.300E−02 |

TABLE 3

Insulator layer 22 and 24

| Wavelength (nm) | n | k |
|---|---|---|
| 400 | 2.032 | 0 |
| 450 | 1.971 | 0 |
| 500 | 1.936 | 0 |
| 550 | 1.915 | 0 |
| 600 | 1.901 | 0 |
| 650 | 1.893 | 0 |
| 700 | 1.887 | 0 |

TABLE 4

Luminescent layer 23

| Wavelength (nm) | n | k |
|---|---|---|
| 400 | 2.321 | 1.373E−02 |
| 450 | 2.264 | 1.039E−02 |
| 500 | 2.223 | 8.480E−03 |
| 550 | 2.193 | 7.320E−03 |
| 600 | 2.170 | 6.580E−03 |
| 650 | 2.152 | 6.100E−03 |
| 700 | 2.138 | 5.770E−03 |

TABLE 5

Index matching layers 30 and 31

| Wavelength (nm) | n | k |
|---|---|---|
| 400 | 1.673 | 0 |
| 450 | 1.667 | 0 |
| 500 | 1.662 | 0 |
| 550 | 1.657 | 0 |
| 600 | 1.654 | 0 |
| 650 | 1.652 | 0 |
| 700 | 1.650 | 0 |

TABLE 6

| Layer | T21 | T22 | T23 | T24 |
|---|---|---|---|---|
| 20 Substrate | 1.1 mm | 1.1 mm | 1.1 mm | 1.1 mm |
| 30 IM | 270 nm | 270 nm | 270 nm | 270 nm |
| 21 First Conductor | — | 350 nm | — | 350 nm |
| 22 First Insulator | 270 nm | 270 nm | 270 nm | 270 nm |
| 23 Luminescent layer | 750 nm | 750 nm | 750 nm | 750 nm |
| 24 Second Insulator | 270 nm | 270 nm | 270 nm | 270 nm |
| 25 Second Conductor | — | 350 nm | 350 nm | — |
| 31 IM | 75 nm | 75 nm | 75 nm | 75 nm |

TABLE 6-continued

| Layer | T21 | T22 | T23 | T24 |
|---|---|---|---|---|
| Photopic T % | 77.0 | 66.8 | 69.8 | 73.8 |
| Average T % | 77.2 | 67.1 | 70.2 | 74.0 |
| Average R % | 7.5 | 11.6 | 11.7 | 7.2 |
| Total Opt. loss % | 15.2 | 21.4 | 18.1 | 18.9 |

Figure 4:
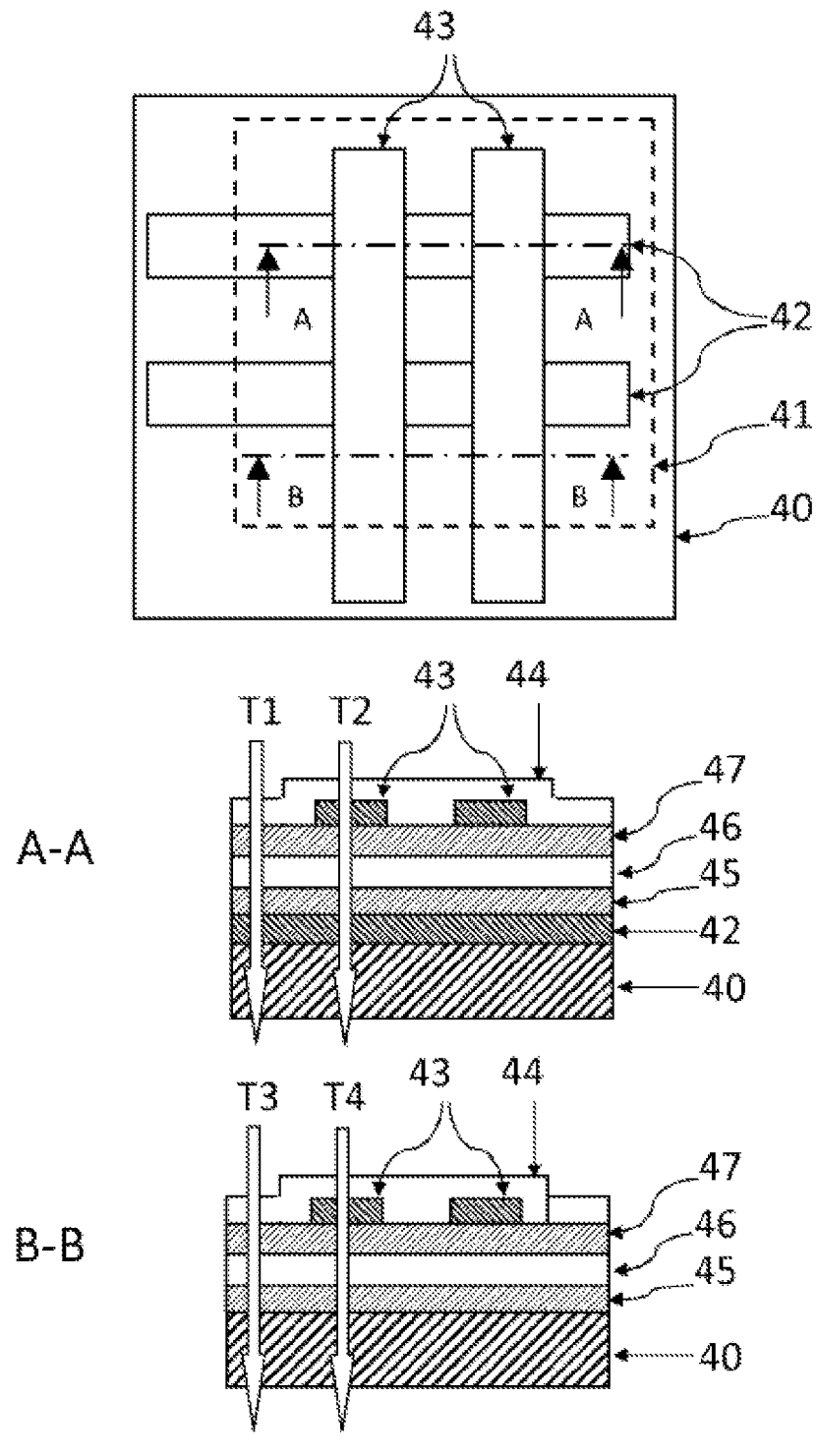
FIG. 4 shows the structure of a detail of a transparent TFEL display according to the prior art.

FIG. 4 shows a prior art arrangement of a transparent TFEL display element having several emissive areas on a substrate 40. In the display area 41 are provided row-forming TCO electrodes 42 and column-forming TCO electrodes 43 intersecting to form areas capable of emitting light in the phosphor layer. Electrodes 42 and 43 are connected to voltage sources (not shown).

Section A-A along row electrode 42 shows, from the bottom up, substrate 40; row electrode 42; a insulator-phosphor-insulator (IPI) stack consisting of first insulator layer 45, phosphor (luminescent) layer 46 and second insulator layer 47; column electrodes 43; and a third insulator layer 44.

Section B-B is outside row electrode 42 and shows the corresponding layers with the exception of row electrode 42.

Display area 41 comprises four types of areas which differ from an optical point of view. The paths of light transmission through these are shown as T1, T2, T3 and T4, respectively:

T1 represents transmission through areas comprising row electrode and IPI stack

T2 represents transmission through areas comprising both row electrode, column electrode and the IPI stack in between T3 represents transmission through areas comprising IPI stack only, and T4 represents transmission through areas comprising column electrode and IPI stack.

Figure 3:
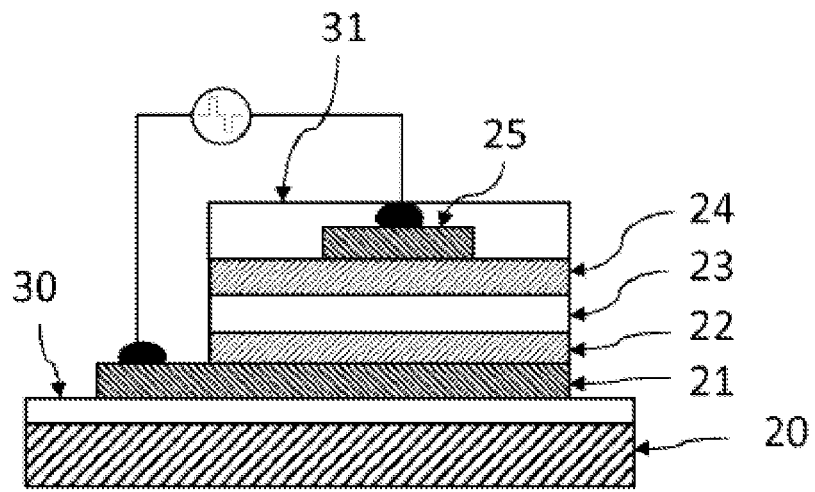
FIGS. 3A-3B are side and plane views of a prior art, optically improved TFEL display element.
Figure 3:
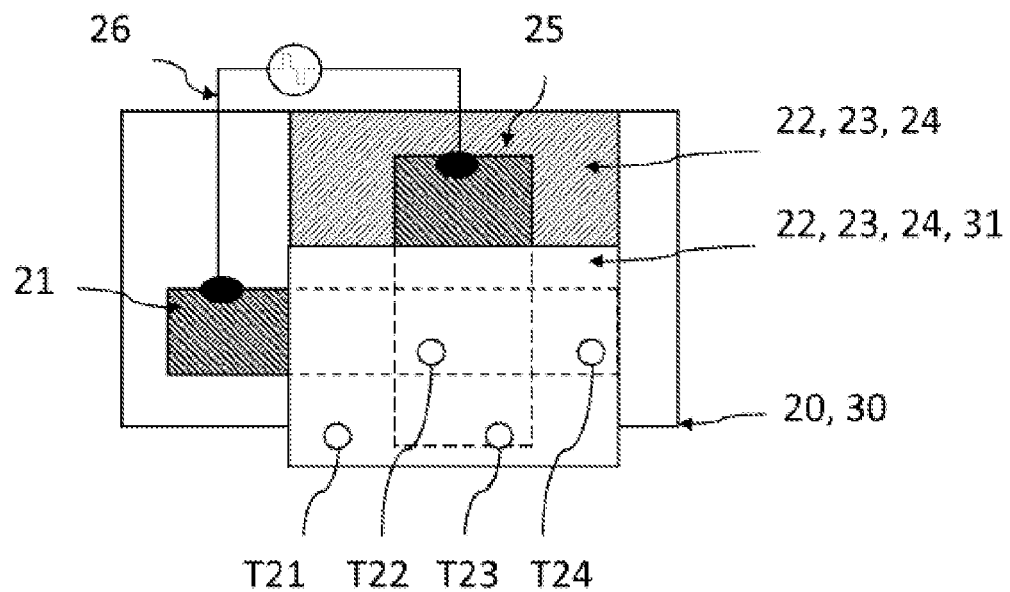

The photopic transmission and reflection data at the various areas of FIG. 4 are the same as previously shown for respective thin film structures T21, T22, T23 and T24 in Table 6 for FIG. 3 B.

Figure 5:
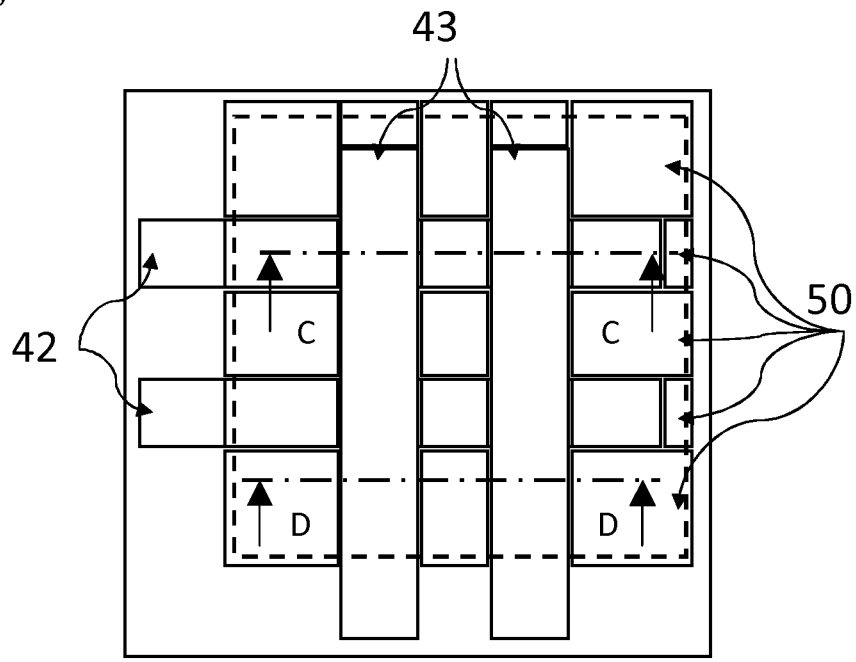
FIG. 5 shows the structure of a detail of a transparent TFEL display according to the present invention.
Figure 5:
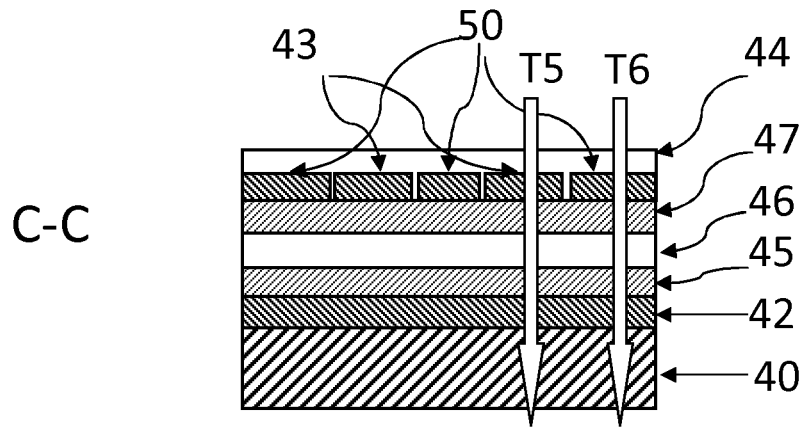
Figure 5:
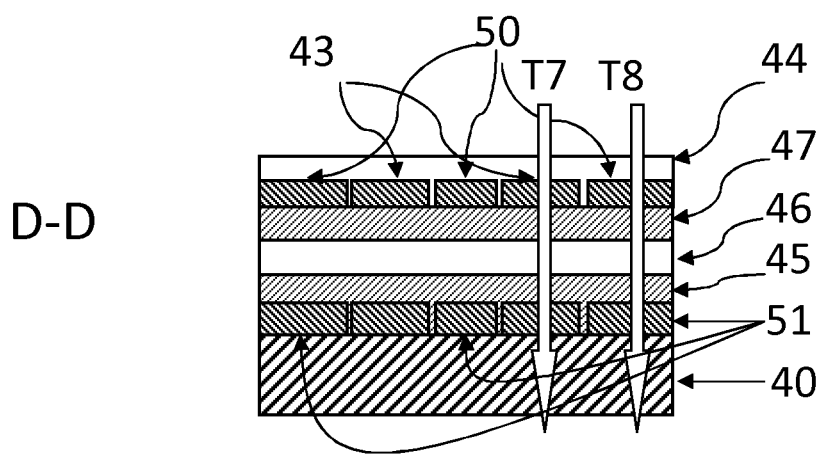

FIG. 5 shows an arrangement of a transparent TFEL display element in accordance with the invention. The structure includes the corresponding row electrodes 42, column electrodes 43 and IPI stack elements 45, 46 and 47, equally designated in FIG. 4.

In addition, the structure in FIG. 5 comprises passive film elements 50 and 51, which consist of electrode material but are not electrically connected. However, they act to provide the same optical structure across essentially the whole display area. Preferably, more than 80% of the area in the layers incorporating TCO material is covered by TCO material of uniform thickness. Refractive index of insulator layer 44 is lower than refractive index of conductor layer 43 and passive film element 50.

Section C-C is taken through a row electrode and section D-D outside a row electrode. Four paths of light transmission, T5, T6, T7 and T8 are shown in FIG. 5.

The photopic transmission and reflection data at the various areas of FIG. 5 are identical to the data shown in Table 6 for area T22 in FIG. 3 B. Photopic T % is 66.8% and average R % 11.6% for all areas T5, T6, T7 and T8. This means the viewer cannot see variations between different areas of the display.

Figure 6:
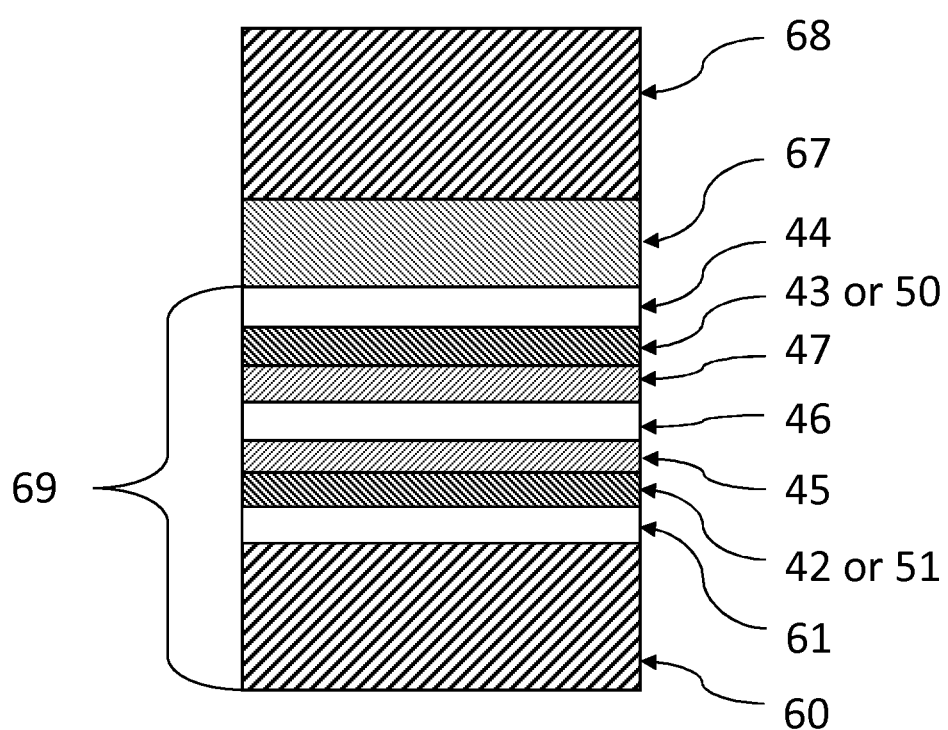
FIG. 6 shows a TFEL structure having a protective glass panel.

FIG. 6 shows a TFEL display element design having the same basic structure as the TFEL display element in FIG. 5, i.e. the optical stack 69 comprises substrate 60; conducting layer 42; insulating layer 45; phosphor layer 46; insulating layer 47; conducting layer 43 and index matching layer 44, whereby conducting layers 42 and 43, according to the invention, comprise passive film elements 50 and 51. Additionally, stack 69 comprises index matching layer 61. On stack 69, a protective glass panel 68 can be attached using transparent adhesive 67 for optical bonding.

Using the TFEL display element structure shown in FIG. 6, the photopic transmission was calculated for various TCO layer 42, 43 and luminescent layer 46 thicknesses. The refractive index for adhesive layer 67 was 1.406. The layer thicknesses and corresponding photopic transmission values are shown in table 7. The table contains also one measured photopic transmission value from a sample according to the present invention. The reduced thickness of layers 42, 43, 46 which give rise to optical losses results in significantly improved photopic transmission. In order to achieve the targeted >78% photopic transmission, the thickness of each of layers 42, 43 and 46 shall be less than or equal to 250 nm.

TABLE 7

| Layer | Sample | | | |
|---|---|---|---|---|
| | Prior art | Calculated 1 | Measured | Calculated 2 |
| 60 | 1.1 mm | 1.1 mm | 1.1 mm | 1.1 mm |
| 61 | 270 nm | 270 nm | 270 nm | 270 nm |
| 42 | 350 nm | 170 nm | 170 nm | 100 nm |
| 45 | 270 nm | 270 nm | 270 nm | 270 nm |
| 46 | 750 nm | 200 nm | 144 nm | 100 nm |
| 47 | 270 nm | 270 nm | 270 nm | 270 nm |
| 43 | 350 nm | 170 nm | 170 nm | 100 nm |
| 44 | 75 nm | 75 nm | 75 nm | 75 nm |
| 67 | 30 μm | 30 μm | 30 μm | 30 μm |
| 68 | 1.1 mm | 1.1 mm | 1.1 mm | 1.1 mm |
| Photopic T % | 69.0% | 80.6% | 82.3% | 83.9% |

Figure 7:
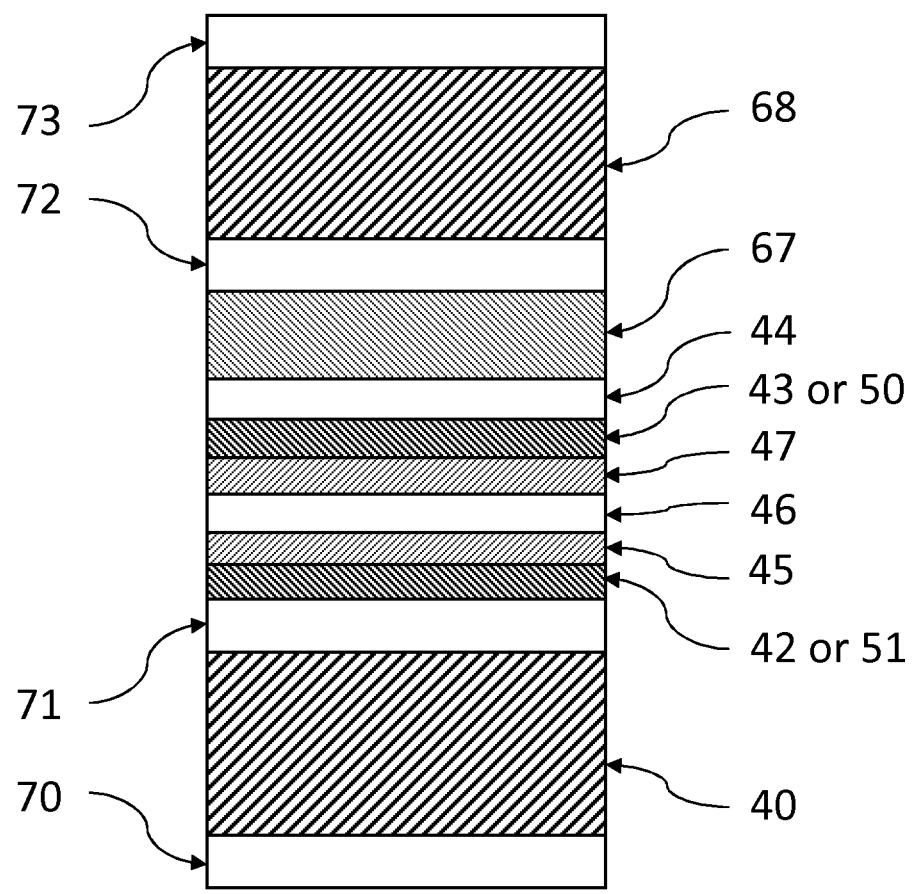
FIG. 7 shows a TFEL structure having additional components for improving its optical properties.

FIG. 7 shows a TFEL display element design in which thin film structures 70, 71, 72 and 73 have been provided on both sides of substrate 40 and protective panel 68 for reducing reflection and enhancing transmission. The task of these structures is to match the glass material to the adjacent environments, minimizing reflection at the interface. Such "index matching" structures improve transparency and inconspicuousness, and may consist of single materials or comprise several different material layers.

Figure 8A:
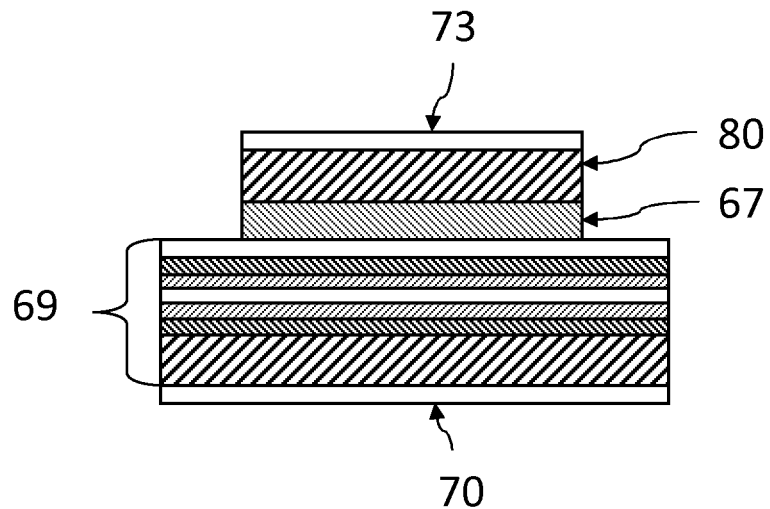
FIGS. 8A to E illustrate several examples of optical bonding in a display element having low off-state perceptibility.

FIG. 8A shows a TFEL display element 69 according to the invention, having substrate antireflection coating 70 and a 1.1 mm thick protective glass sheet 80 optically bonded to the element by layer 67 and having an antireflection coating 73.

Figure 8B:
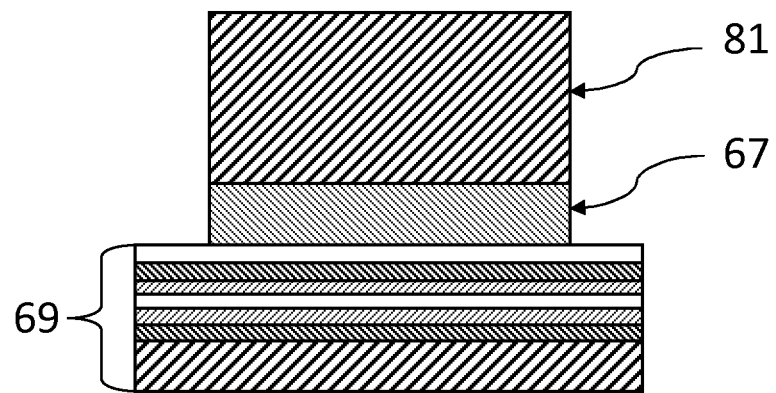

FIG. 8B shows a TFEL display element 69 according to the invention, optically bonded on its thin film side (as opposed to the substrate side) by means of layer 67 to a 5.0 mm thick, chemically strengthened safety glass panel 81.

Figure 8C:
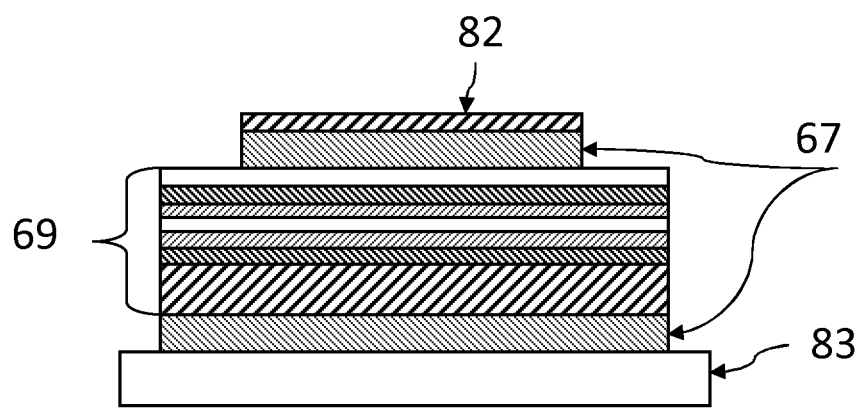

FIG. 8C shows a TFEL display element 69 according to the invention, optically bonded on its thin film side to a 0.3 mm thick protective glass sheet 82 and on the substrate side to a 1.0 mm thick sapphire sheet 83, both by means of layers 67.

Figure 8D:
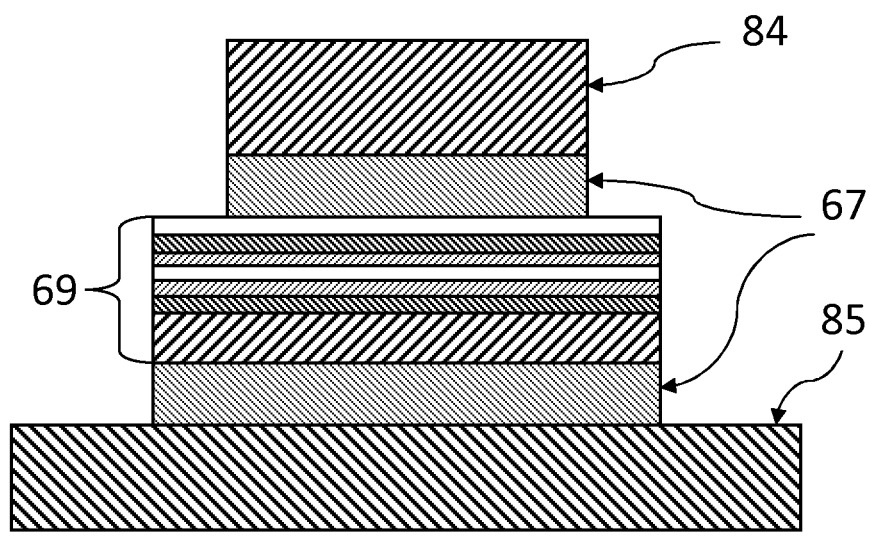

FIG. 8D shows a TFEL display element 69 according to the invention, optically bonded by means of layer 67 on its thin film side to a 3.0 mm thick, chemically strengthened safety glass panel 84 and on the substrate side to non-transparent material 85, the surface of which is to remain visible to an observer. The non-transparent material may be e.g. metal, wood or a coated material.

Figure 8E:
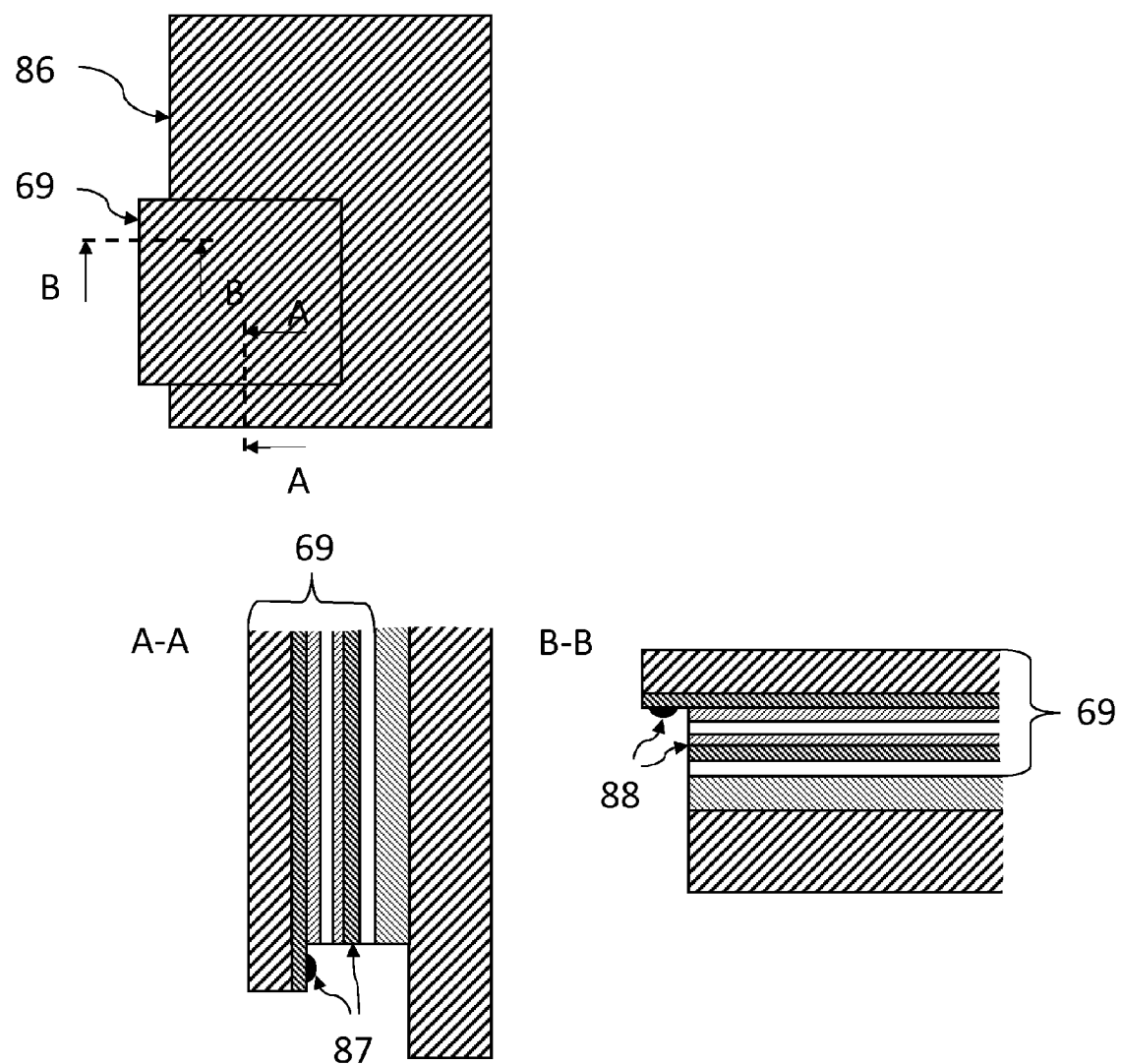

FIG. 8E shows TFEL display element 69 according to the invention, optically bonded on its thin film side to a 3.0 mm thick protective glass panel 86, which is larger than the substrate of TFEL element 69. Electrical contacts to the TFEL display element are located either between the glass panels (substrate and protective sheet) as shown at 87 in section A-A, or at 88 in section B-B, outside the area of the protective glass sheet.

Figure 9A:
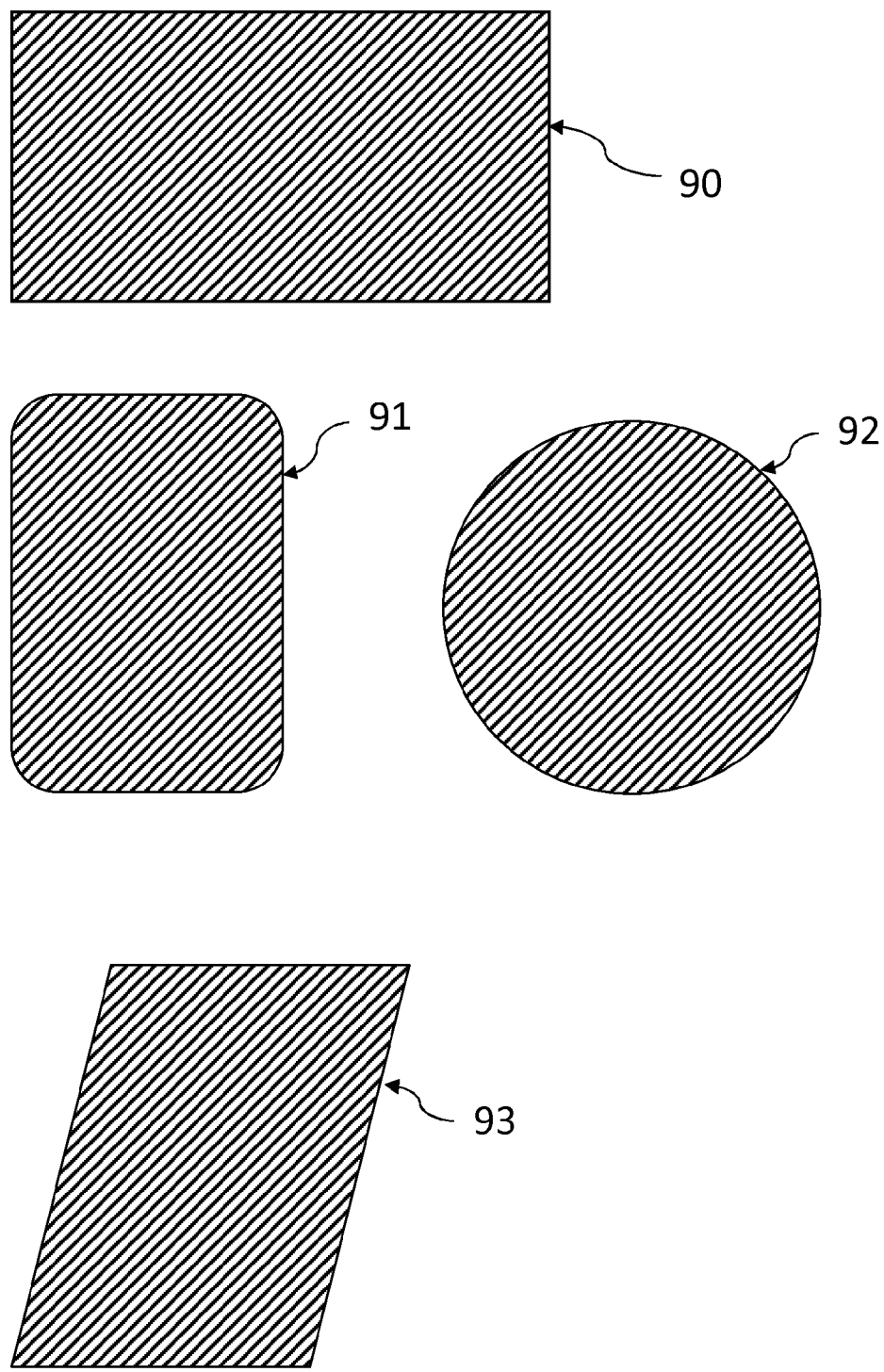
FIGS. 9A to C illustrate examples of structural variations in a display element according to the invention.

FIG. 9A shows various shapes in which a TFEL display element according to the invention may be prepared e.g. from a larger substrate sheet: rectangular 90, rectangular with rounded corners 91, circular 92 or parallelogram 93.

Figure 9B:
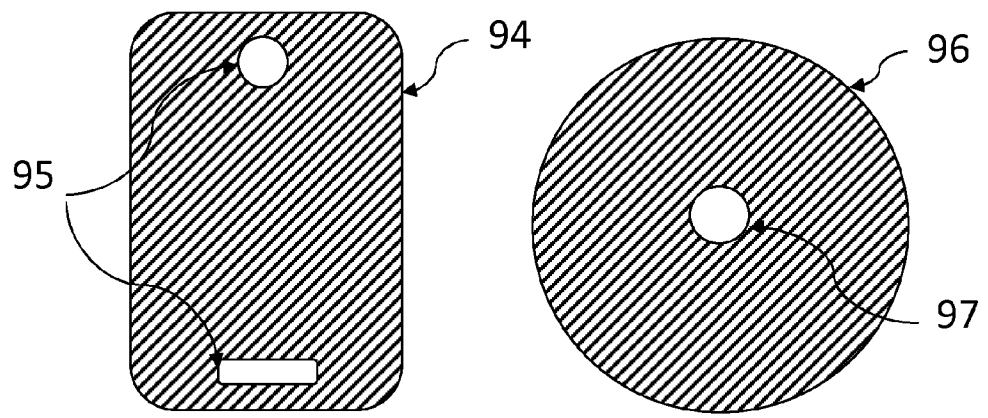

FIG. 9B shows TFEL display elements according to the invention, having round or rectangular apertures 95, 97, cut by drilling or laser cutting in rounded-corner rectangular element 94 and circular element 96.

Figure 9C:
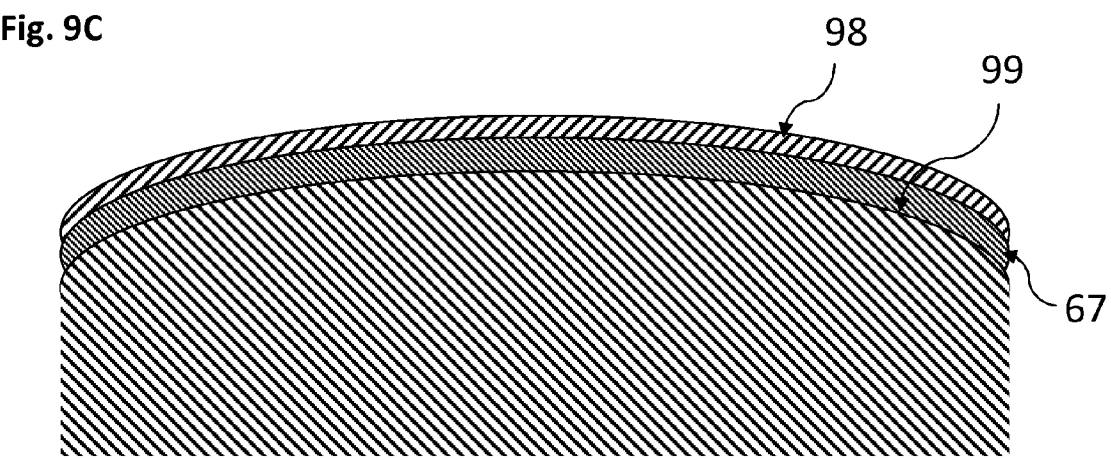

FIG. 9C shows a TFEL display element 98 according to the invention optically bonded to a convex surface 99 by means of layer 67.

Figure 10:
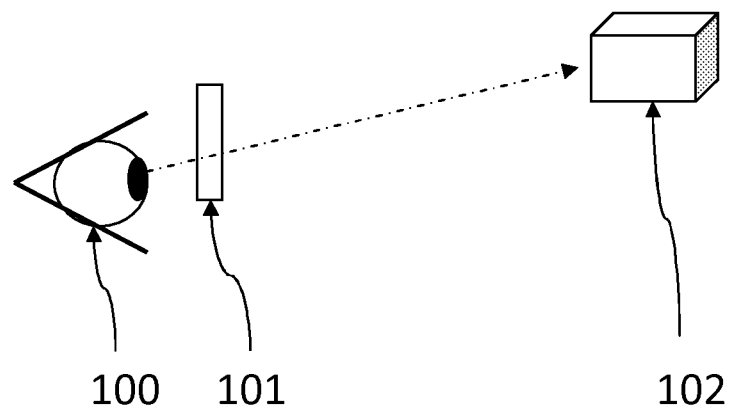
FIG. 10 illustrates the use of a display element according to the invention in a HMD device.

FIG. 10 shows a TFEL display element 101 according to the invention as a HMD device in front of a viewer's eye 100, allowing unobstructed observation of the environment and object 102 due to its high transparency and inconspicuousness.

The invention claimed is:

1. An inorganic, transparent thin film electroluminescent display element with a display area having at least one emissive area and at least one non-emissive area, the display element comprising a layer structure on a substrate, said layer structure comprising
    a first conducting layer comprising transparent conductive material, having a thickness in the range 30-250 nm,
    a first insulating layer comprising insulating, inorganic material,
    a luminescent layer comprising zinc sulfide, having a thickness in the range 30-250 nm,
    a second insulating layer comprising insulating, inorganic material,
    a second conducting layer comprising transparent conductive material, having a thickness in the range 30-250 nm,
    a third insulating layer comprising insulating, inorganic material having a lower refractive index than that of the second conducting layer,
characterized in that each of said first and second conducting layers comprises at least one conductor element at the at least one emissive area and at least one passive film element at the at least one non-emissive area.

2. A display element according to claim 1, wherein the sum of the emissive areas covered by the conductor elements and the non-emissive areas covered by the passive film elements is >80% of the display area.

3. A display element according to claim 1, whose photopic transmission is >78%.

4. A display element according to claim 1, wherein the transparent conductive material comprises indium tin oxide.

5. A display element according to claim 1, wherein the first and second insulating layers comprise at least one of aluminium oxide, titanium oxide, and combinations and mixtures of these.

6. A display element according to claim 1, wherein the third insulating layer comprises aluminium oxide.

7. A display element according to claim 1, wherein the luminescent layer comprises manganese-doped zinc sulfide ZnS:Mn.

8. A display element according to claim 1, wherein the luminescent layer comprises terbium-doped zinc sulfide ZnS:Tb.

9. A display element according to claim 1, comprising a glass panel optically bonded to the third insulating layer.

10. A display element according to claim 1, wherein at least part of the conducting layers form a matrix of intersecting electrodes.

11. A display element according to claim 1, wherein at least part of the conducting layers are formed so as to provide emissive segments, icons, or symbols at predetermined locations of the display area.

12. A display element according to claim 1, wherein at least one light emitting zone is provided in the display area for illuminating the area behind the display.

13. A method of manufacturing an inorganic, transparent thin film electroluminescent display element with a display area having at least one emissive area and at least one non-emissive area, the method comprising the steps of
    providing a substrate,
    preparing a first conducting layer comprising transparent conductive material, having a thickness in the range 30-250 nm,
    depositing by atomic layer deposition a first insulating layer comprising insulating, inorganic material,
    depositing by atomic layer deposition a luminescent layer comprising zinc sulfide, having a thickness in the range 30-250 nm,
    depositing by atomic layer deposition a second insulating layer comprising insulating, inorganic material,
    preparing a second conducting layer comprising transparent conductive material, having a thickness in the range 30-250 nm, and
    preparing a third insulating layer comprising insulating, inorganic material having a lower refractive index than that of the second conducting layer,
characterized in that each of said first and second conducting layers is prepared so as to comprise at least one conductor element at the at least one emissive area and at least one passive film element at the at least one non-emissive area.

* * * * *